US010627891B2

(12) United States Patent
Wang et al.

(10) Patent No.: US 10,627,891 B2
(45) Date of Patent: Apr. 21, 2020

(54) POWER SUPPLY SYSTEM AND POWER SUPPLY METHOD

(71) Applicant: Acer Incorporated, New Taipei (TW)

(72) Inventors: Shih-Wei Wang, New Taipei (TW); Chun-Chih Kuo, New Taipei (TW); Meng-Chieh Tsai, New Taipei (TW)

(73) Assignee: Acer Incorporated, New Taipei (TW)

( * ) Notice: Subject to any disclaimer, the term of this patent is extended or adjusted under 35 U.S.C. 154(b) by 191 days.

(21) Appl. No.: 15/649,625

(22) Filed: Jul. 13, 2017

(65) Prior Publication Data

US 2018/0173297 A1    Jun. 21, 2018

(30) Foreign Application Priority Data

Dec. 15, 2016   (TW) .............................. 105141547 A

(51) Int. Cl.

| *G06F 1/26* | (2006.01) |
|---|---|
| *G06F 1/3287* | (2019.01) |
| *G06F 1/3296* | (2019.01) |
| *G06F 1/3234* | (2019.01) |

(52) U.S. Cl.

CPC ............ *G06F 1/3287* (2013.01); *G06F 1/263* (2013.01); *G06F 1/3265* (2013.01); *G06F 1/3296* (2013.01)

(58) Field of Classification Search

CPC ...... G06F 1/263; G06F 1/3296; G06F 1/3265; G06F 1/3287; G06F 1/26

See application file for complete search history.

(56) References Cited

U.S. PATENT DOCUMENTS

| 5,754,868 A | * | 5/1998 | Yamamoto | .............. G06F 1/263 307/66 |
|---|---|---|---|---|
| 6,564,333 B1 | * | 5/2003 | Ho | ............................ G06F 1/26 713/310 |
| 2003/0105567 A1 | * | 6/2003 | Koenig | ................. H01M 10/48 701/36 |
| 2008/0201584 A1 | * | 8/2008 | Tatsumi | ................ G06F 1/3203 713/300 |
| 2010/0257529 A1 | * | 10/2010 | Wilkerson | .............. G06F 1/263 718/102 |
| 2010/0270863 A1 | * | 10/2010 | Togare | .................... H02J 1/102 307/80 |

(Continued)

FOREIGN PATENT DOCUMENTS

| CN | 102148532 | 8/2011 |
|---|---|---|
| TW | 201044155 | 12/2010 |

(Continued)

*Primary Examiner* — Jaweed A Abbaszadeh
*Assistant Examiner* — Brian J Corcoran
(74) *Attorney, Agent, or Firm* — JCIPRNET

(57) ABSTRACT

A power supply system and a power supply method are provided. The power supply system includes a target device, a power supplier module and a control circuit. The control circuit is coupled to the target device and the power supplier module. The control circuit transmits a power provided by the power supplier module to the target device and disables a sub-target device of the target device if the power supplier module does not meet a default condition. The control circuit transmits the power provided by the power supplier module to the target device and enables the sub-target device if the power supplier module meets the default condition.

8 Claims, 3 Drawing Sheets

(56) References Cited

U.S. PATENT DOCUMENTS

| | | | | |
|---|---|---|---|---|
| 2010/0332860 | A1* | 12/2010 | Trantham | G06F 1/263 |
| | | | | 713/300 |
| 2011/0266873 | A1* | 11/2011 | Tsuji | G06F 1/1632 |
| | | | | 307/66 |
| 2012/0069614 | A1* | 3/2012 | Park | H02M 3/1582 |
| | | | | 363/97 |
| 2012/0144183 | A1* | 6/2012 | Heinrichs | G06F 11/3062 |
| | | | | 713/100 |
| 2014/0108846 | A1* | 4/2014 | Berke | G06F 1/263 |
| | | | | 713/340 |
| 2015/0357815 | A1* | 12/2015 | Luh | H02J 3/00 |
| | | | | 307/31 |

FOREIGN PATENT DOCUMENTS

| | | |
|---|---|---|
| TW | 201351379 | 12/2013 |
| TW | I531137 | 4/2016 |

\* cited by examiner

POWER SUPPLY SYSTEM AND POWER SUPPLY METHOD

CROSS-REFERENCE TO RELATED APPLICATION

This application claims the priority benefit of Taiwan application serial no. 105141547, filed on Dec. 15, 2016. The entirety of the above-mentioned patent application is hereby incorporated by reference herein and made a part of this specification.

BACKGROUND OF THE INVENTION

1. Field of the Invention

The invention relates to a power management mechanism, and more particularly, to a power supply system and a power supply method.

2. Description of Related Art

As hardware specification of computer device such as notebook computer continue to improve, computer device also have increasing needs for more power. For example, in the future game-specific notebook computers, power supply requirement can be as high as 500 watts (W). Accordingly, with the specification of existing power supply, it may require two or more power suppliers connected in series to provide enough power for computer device.

However, the existing power supply structure usually does not support use of two or more power suppliers for providing power and lacks of a system structure capable of dynamically switching between power supply paths of multiple power suppliers.

SUMMARY OF THE INVENTION

The invention is directed to a power supply system and a power supply method, which are capable of satisfying the demands of powers with different intensities for electronic device.

An embodiment of the invention provides a power supply system, which includes a target device, a power supplier module and a control circuit. The control circuit is coupled to the target device and the power supplier module. The control circuit transmits a power provided by the power supplier module to the target device and disables a sub-target device of the target device if the power supplier module does not meet a default condition. The control circuit transmits the power provided by the power supplier module to the target device and enables the sub-target device if the power supplier module meets the default condition.

Another embodiment of the invention provides a power supply method, which includes: determining whether a power supplier module meets a default condition; transmitting a power provided by the power supplier module to the target device and disabling a sub-target device of the target device if the power supplier module does not meet the default condition; and transmitting the power provided by the power supplier module to the target device and enabling the sub-target device if the power supplier module meets the default condition.

Based on the above, if the power supplier module does not meet the default condition, the control circuit may transmit the power provided by the power supplier module to the target device and further disable the sub-target device of the target device, so as to prevent the electronic device from malfunction due to insufficient power supply. Further, if the power supplier module meets the default condition, the control circuit may transmit the power provided by the power supplier module to the target device and further enable the sub-target device, so as improve a computing performance of the electronic device based on the sufficient power supply.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
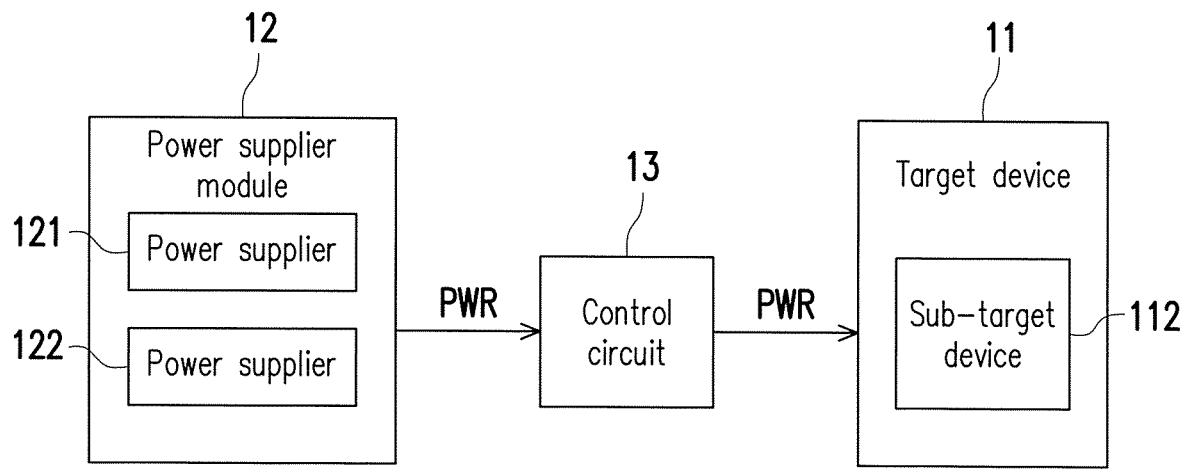
FIG. 1 is a schematic diagram illustrating a power supply system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram illustrating a power supply system according to an embodiment of the invention.

With reference to FIG. 1, a power supply system 10 can be disposed in various electronic devices with computing capability, such as notebook computers, desktop computers, industrial computers, smart phones or tablet computers. The power supply system 10 includes a target device 11, a power supplier module 12 and a control circuit 13.

The target device 11 may include any kind of electronic circuits or peripheral equipments, such as central processing unit, display chip, memory, monitor, various input/output interfaces and/or network interface card, which need to be powered in an electronic device disposed with the power supply system 10. The target device 11 includes a sub-target device 112. The sub-target device 112 refers to electronic circuits that can be dynamically disabled or enabled during operation of the electronic device. Here, to enable the sub-target device 112 refers to allowing the sub-target device 112 to be powered on (e.g., turning on a power supply path connected to the sub-target device 112) and allowing the sub-target device 112 to participate operation of the electronic device. Conversely, to disable the sub-target device 112 refers to disallowing the sub-target device 112 to be powered on (e.g., turning off the power supply path connected to the sub-target device 112) and disallowing the sub-target device 112 to participate operation of the electronic device.

In an embodiment, the electronic device includes a plurality of display chips, and the sub-target device 112 is a secondary display chip among these display chips. For example, in some cases, if a supplying power of the electronic device is enough to support simultaneous operation of a primary display chip and at least one secondary display chip of the electronic device, the secondary display chip is then enabled (i.e., the secondary display can cooperate with the primary display chip for image processing) so overall image processing performance of the electronic device can be improved. Nonetheless, in some cases, if the supplying power of the electronic device is not enough to support simultaneous operation of the primary display chip and at least one secondary display chip of the electronic device, the secondary display chip is then disabled (i.e., only the primary display chip maintains operating for image processing) so as to reduce overall power consumption required by the target device 11.

It should be noted that, the secondary display chip of the electronic device is used as an example of the sub-target device 112 in the following embodiments. However, in other embodiments not mentioned, the sub-target device 112 may also refer to any electronic circuit that can be dynamically disabled or enabled in response to a current power supply state in the electronic device. For example, in an embodiment, the sub-target device 112 may also be a specific hardware core of a CPU or a specific connecting interface (e.g., a USB connecting interface) of the electronic circuit.

The power supplier module 12 is configured to provide the power required in operation of the electronic device. The power supplier module 12 includes a plurality of power suppliers. In the present embodiment, a power supplier (also known as a first power supplier) 121 and a power supplier (also known as a second power supplier) 122 are used as an example of the plurality of power suppliers in the power supplier module 12. It should be noted that, a power supply specification of the power supplier 121 may be different from or identical to a power supply specification of the power supplier 122.

The control circuit 13 is coupled to the target device 11 and the power supplier module 12. The control circuit 13 is configured to transmit a power PWR provided by the power supplier module 12 to the target device 11. In other words, the power PWR provided by the power supplier module 12 is provided to the target device 11 as power supply via the control circuit 13.

In the present embodiment, the control circuit 13 determines whether the power supplier module 12 meets a default condition. If the power supplier module 12 does not meet a default condition, the control circuit 13 transmits the power PWR provided by the power supplier module 12 to the target device 11 and further disables the sub-target device 112 of the target device 11. In addition, if the power supplier module 12 meets the default condition, the control circuit 13 transmits the power PWR provided by the power supplier module 12 to the target device 11 and further enables the sub-target device 112.

In the present embodiment, the control circuit 13 determines whether the power supplier module 12 meets the default condition in accordance with whether the power supplier 121 and the power supplier 122 of the power supplier module 12 are detected at the same time. For example, if the power supplier 121 and the power supplier 122 are detected by the control circuit 13 at the same time (i.e., the power supplier 121 and the power supplier 122 are already connected to the electronic device or the power supply system 10), the control circuit 13 determines that the power supplier module 12 meets the default condition. Otherwise, if the power supplier 121 and the power supplier 122 are not detected by the control circuit 13 at the same time (i.e., either the power supplier 121 or the power supplier 122 is not connected to the electronic device or the power supply system 10), the control circuit 13 determines that the power supplier module 12 does not meet the default condition. Moreover, the control circuit 13 provides different power supply paths in correspondence to whether the power supplier module 12 meets the default condition, so these power supply paths can be used to transmit the power PWR provided by the power supplier module 12 to the target device 11.

Figure 2:
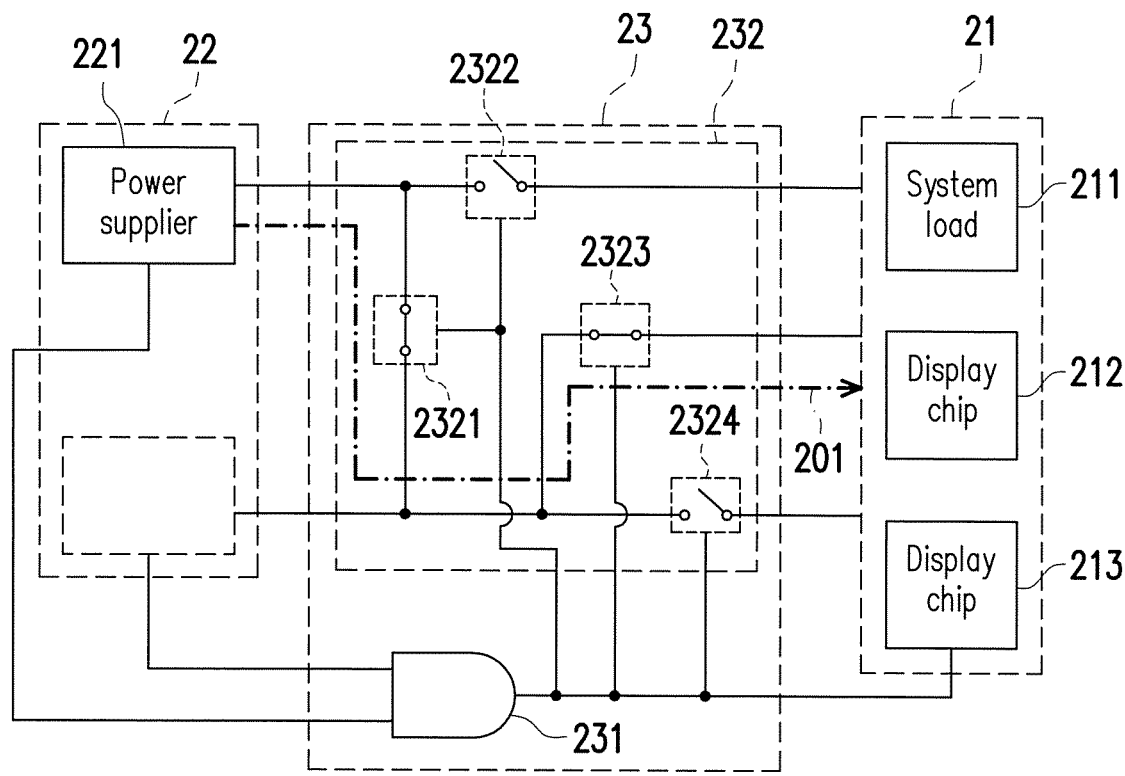
FIG. 2 is a schematic diagram illustrating a first power supply path used for transmitting power according to an embodiment to the invention.

FIG. 2 is a schematic diagram illustrating a first power supply path used for transmitting power according to an embodiment to the invention.

With reference to FIG. 2, a power supply system 20 includes a target device 21, a power supplier module 22 and a control circuit 23. The target device 21 includes a system load 211, a display chip 212 and a display chip 213. For example, the display chip 212 refers to the primary display chip in an electronic device, the display chip 213 refers to the secondary display chip configured to assist the primary display chip for image processing in the electronic device, and the system load 211 refers to other electronic circuits in the electronic device need to be powered.

In the present embodiment, only a power supplier 221 in the power supplier module 22 is connected to the power supply system 20. Hence, since the power supplier 221 is detected and a power supplier 222 is not detected, the control circuit 23 determines that the power supplier module 22 does not meet the default condition. Because the power supplier 221 is detected and the power supplier 222 is not detected by the control circuit 23, the control circuit 23 transmits a power (also known as a first power) provided by the power supplier 221 to the target device 21 through a power supply path (also known as a first power supply path) 201. In the meantime, the control circuit 23 disables the display chip 213.

More specifically, the control circuit 23 includes an enabling unit 231 and a switch module 232. The enabling unit 231 is configured to detect connected power suppliers in the power supplier module 22. For example, in the present embodiment, the connected power supplier 221 can be detected by the enabling unit 231. The switch module 232 is coupled to the power supplier module 22 and the target device 21 and forms one or more power supply paths between the power supplier module 22 and the target device 21.

In the present embodiment, because the power supplier module 22 does not meet the default condition, the switch module 232 is in a default state (also known as a first state). The switch module 232 in the first state forms the power supply path 201 and another power supply path (also known as a second power supply path). It should be noted that, description regarding the second power supply path is omitted herein but will be described with reference to the embodiment of FIG. 3 below.

In the present embodiment, the switch module 232 includes a switch unit (also known as a first switch unit) 2321, a switch unit (also known as a second switch unit) 2322, a switch unit (also known as a third switch unit) 2323 and a switch unit (also known as a fourth switch unit) 2324 which are coupled with one another in a coupling relation shown in FIG. 2. In the first state, the switch units 2321 and 2323 are in a closed state (i.e., current can flow through the switch unit 2321 and the switch unit 2323) and the switch units 2322 and 2324 are in an opened state (i.e., current cannot flow through the switch unit 2322 and the switch unit 2324), as shown in FIG. 2. Thus, in the first state, the power provided by the power supplier 221 can be transmitted to the target device 21 along the power supply path 201 so as to supply power to the system load 211 and the display chip 212. Moreover, because the display chip 213 is disabled, no additional power consumption is caused by the display chip 213 (or the power consumption of the display chip 213 is negligibly small).

Figure 3:
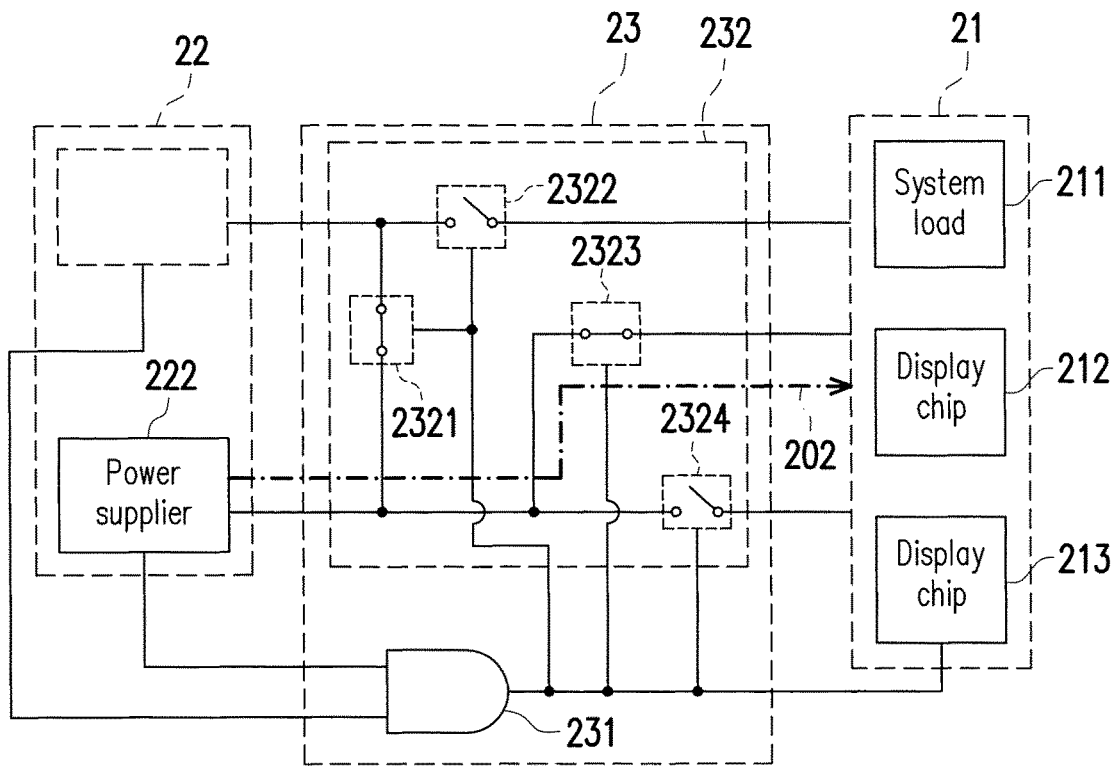
FIG. 3 is a schematic diagram illustrating a second power supply path used for transmitting power according to an embodiment to the invention.

FIG. 3 is a schematic diagram illustrating a second power supply path used for transmitting power according to an embodiment to the invention.

With reference to FIG. 3, in the present embodiment, only the power supplier 222 in the power supplier module 22 is connected to the power supply system 20. Hence, since the power supplier 222 is detected and the power supplier 221 is not detected, the control circuit 23 determines that the power supplier module 22 does not meet the default condition. For example, the connected power supplier 222 can be detected by the enabling unit 231. Because the power supplier 222 is detected and the power supplier 221 is not detected by the control circuit 23, the control circuit 23 transmits a power (also known as a second power) provided by the power supplier 222 to the target device 21 through a power supply path (i.e., the second power supply path) 202. In the meantime, the control circuit 23 also disables the display chip 213.

In the present embodiment, because the power supplier module 22 does not meet the default condition, the switch module 232 is also in aforesaid first state. The switch module 232 in the first state forms the power supply path 202 and aforesaid first power supply path (i.e., the power supply path 201 of FIG. 2), as shown in FIG. 3. Thus, in the first state, the power provided by the power supplier 222 can be transmitted to the target device 21 along the power supply path 202 so as to supply power to the system load 211 and the display chip 212. Similarly, because the display chip 213 is disabled, no additional power consumption is caused by the display chip 213 (or the power consumption of the display chip 213 is negligibly small).

Figure 4:
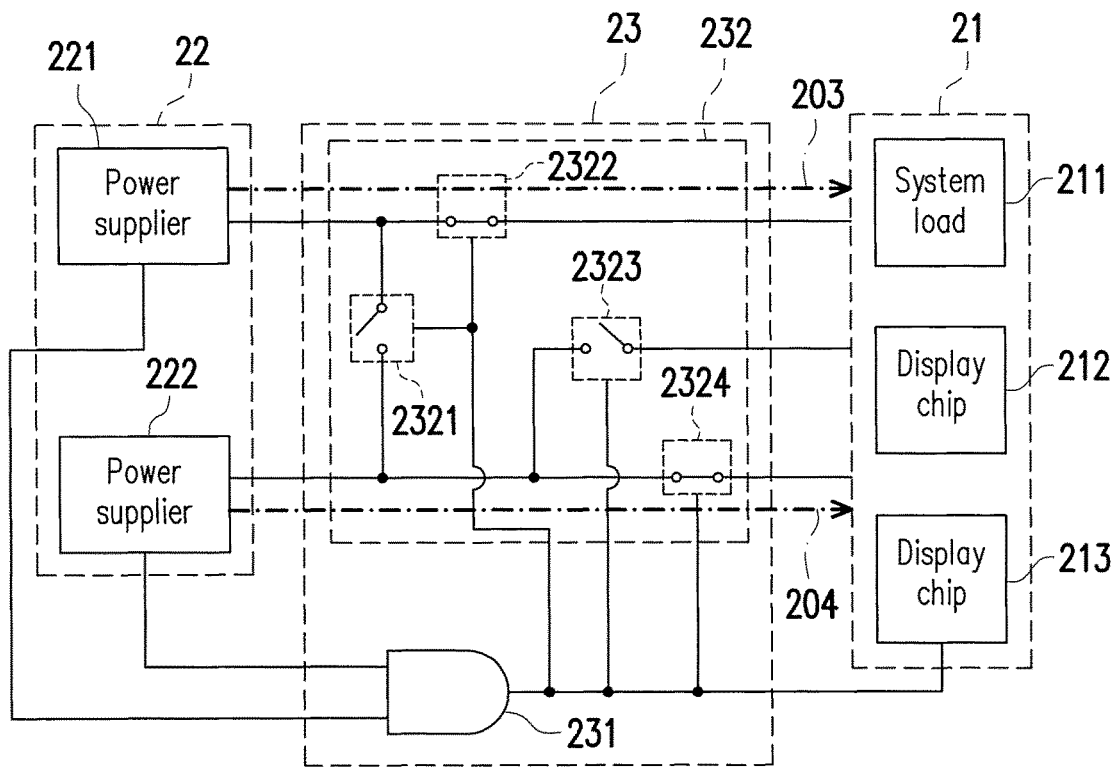
FIG. 4 is a schematic diagram illustrating a third power supply path and a fourth power supply path used for transmitting power according to an embodiment to the invention.

FIG. 4 is a schematic diagram illustrating a third power supply path and a fourth power supply path used for transmitting power according to an embodiment to the invention.

With reference to FIG. 4, in the present embodiment, the power supplier 221 and the power supplier 222 in the power supplier module 22 are both connected to the power supply system 20. Hence, since the power supplier 221 and the power supplier 222 are detected at the same time, the control circuit 23 determines that the power supplier module 22 meets the default condition. Because the power supplier module 22 meets the default condition, the control circuit 23 transmits the power (i.e., the first power) provided by the power supplier 221 to the target device 21 through a power supply path (also known as a third power supply path) 203 and transmits the power (i.e., the second power) provided by the power supplier 222 to the target device 21 through a power supply path (also known as a fourth power supply path) 204. In the meantime, because the power supplier module 22 meets the default condition, the control circuit 23 enables the display chip 213.

More specifically, in the present embodiment, the enabling unit 231 can detect both the power supplier 221 and the power supplier 222 connected at the same time and can generate an enabling signal. This enabling signal is configured to enable the display chip 213. For example, when the enabling signal is received by the display chip 213, the display chip 213 is switched to a standby state (or a working state) from a disabled state. Alternatively, this enabling signal may also be transmitted to a device capable of enabling or disabling the display chip 213 such as the CPU of the electronic device so such device can enable the display chip 213 according to this enabling signal.

It should be noted that, the enabling unit 231 is illustrated as an AND gate as example in the present embodiment. However, in other embodiments, the enabling unit 231 may also be implemented by using circuit elements of other types as long as the connection of the power supplier 221 and the power supplier 222 can be detected and the corresponding enabling signal can be generated.

In the present embodiment, the switch module 232 also receives the enabling signal generated by the enabling unit 231. In response to this enabling signal, the switch module 232 is switched to another state (also known as a second state) from aforesaid first state. The switch module 232 in the second state forms the power supply path 203 and the power supply path 204, as shown in FIG. 4. For example, in response to this enabling signal, the switch units 2321 and 2323 are switched to the opened state from the original closed state, and the switch units 2322 and 2324 are switched to the closed state from the original opened state. In other words, in the second state, current cannot flow through the switch unit 2321 and the switch unit 2323 but can flow through the switch unit 2322 and the switch unit 2324. Thus, in the second state, the power provided by the power supplier 221 is transmitted to the target device 21 along the power supply path 203 and the power provided by the power supplier 222 is transmitted to the target device 21 along the power supply path 204, so as to commonly supply power to the system load 211, the display chip 212 and the display chip 213 in the target device 21 by the power supplier 221 and the power supplier 222.

It should be noted that, although the coupling relations of the switch units 2321 to 2324 of the switch module 232 in the power supply system 20 are clearly illustrated in embodiments of FIG. 2 to FIG. 4, nevertheless, in other embodiments not mentioned, the coupling relation of the switch units 2321 to 2324 in the power supply system 20 may also be altered instead of limited the coupling relations illustrated in FIG. 2 to FIG. 4. In an embodiment, each of the switch units 2321 to 2324 may, for example, include an electronic element having switch function, such as one or more transistors. Furthermore, more electronic circuit elements such as one or more switch units may also added to the power supply system 20 as long as the routing path for transmitting power in the power supply system 20 can satisfy abovementioned condition.

In addition, in the embodiment where the sub-target device that can be disabled is the secondary display chip, the electronic device disposed with the power supply system 10 (or 20) usually includes a monitor (or a display), which serves as a display interface for image data processed by the display chip.

Figure 5:
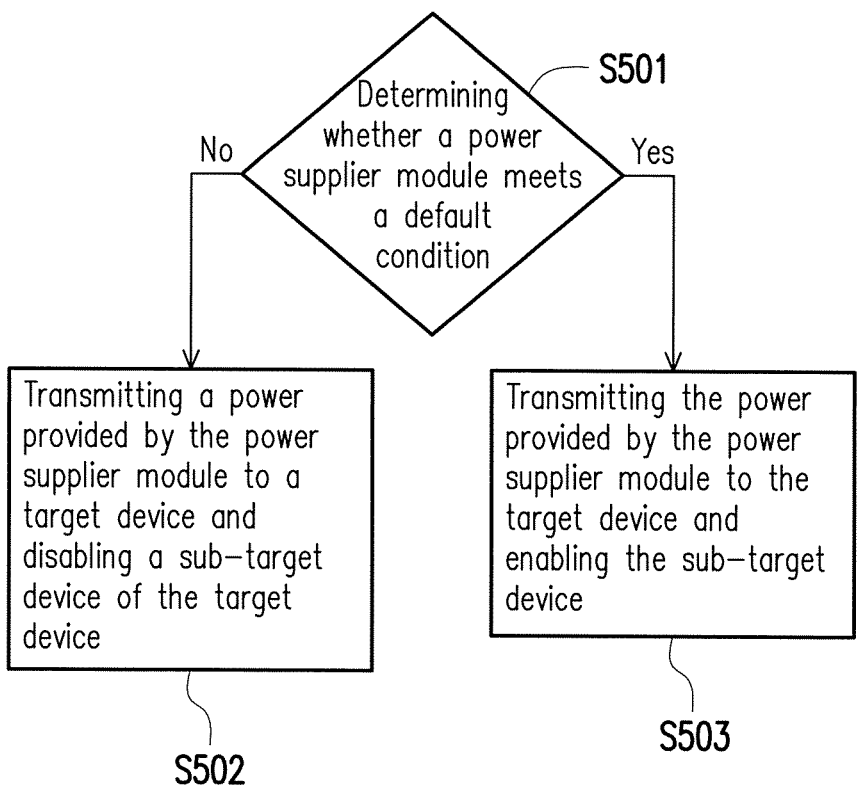
FIG. 5 is a flowchart illustrating a power supply method according to an embodiment of the invention.

FIG. 5 is a flowchart illustrating a power supply method according to an embodiment of the invention.

With reference to FIG. 5, in step S501, whether a power supplier module meets a default condition is determined. If the power supplier module does not meet the default condition, a power provided by the power supplier module is transmitted to a target device and a sub-target device of the target device is disabled in step S502. Further, if the power supplier module meets the default condition, the power provided by the power supplier module is transmitted to the target device and the sub-target device is enabled in step S503.

Nevertheless, steps depicted in FIG. 5 are described in detail as above so that related description thereof is omitted hereinafter. It should be noted that, the steps depicted in FIG. 5 may be implemented as a plurality of program codes or circuits, which are not particularly limited in the invention. Moreover, the method disclosed in FIG. 5 may be implemented by reference with above exemplary embodiments, or may be implemented separately, which are not particularly limited in the invention.

In summary, the power supply system and the power supply method provided by the invention can dynamically adjust the path for providing the power and determine whether to enable the specific sub-target device of the target device according to whether the power supplier module meets the default condition. For example, the sub-target device may be an electronic circuit having a required power consumption higher than a preset value in operation of the target device or may be any predetermined electronic circuit. In this way, when the power supply is relatively low (e.g., only one power supplier is being connected), the electronic device can be prevented from malfunction due to insufficient power supply. Alternatively, when the power supply is sufficient (e.g., two or more power suppliers are connected at the same time), the computing performance of the electronic device can be improved. As a result, the present invention can achieve a balance between power supply and performance for the electronic device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power supply system, comprising:
   a target device comprising at least one sub-target device;
   a power supplier module comprising a first power supplier and a second power supplier; and
   a control circuit, coupled to the target device and the power supplier module,
   wherein the control circuit transmits a power provided by the power supplier module to the target device and disables at least one of the at least one sub-target device to reduce an operating current of the disabled sub-target device and prevent the target device from malfunction due to insufficient power supply if the power supplier module does not meet a default condition,
   wherein the control circuit transmits the power provided by the power supplier module to the target device and enables the at least one sub-target device if the power supplier module meets the default condition,
   wherein the control circuit transmits a first power provided by the first power supplier to the target device through a first power supply path if the first power supplier is detected and the second power supplier is not detected by the control circuit,
   wherein the control circuit transmits a second power provided by the second power supplier to the target device through a second power supply path if the second power supplier is detected and the first power supplier is not detected by the control circuit,
   wherein the control circuit transmits the first power to the target device through a third power supply path and transmits the second power to the target device through a fourth power supply path if the first power supplier and the second power supplier are detected by the control circuit at the same time.

2. The power supply system according to claim 1,
   wherein the control circuit determines that the power supplier module does not meet the default condition if the first power supplier and the second power supplier are not detected by the control circuit at the same time,
   wherein the control circuit determines that the power supplier module meets the default condition if the first power supplier and the second power supplier are detected by the control circuit at the same time.

3. The power supply system according to claim 1, wherein the control circuit comprises:
   an enabling unit; and
   a switch module, coupled to the enabling unit,
   wherein the switch module is in a first state if the power supplier module does not meet the default condition,
   wherein the switch module in the first state forms the first power supply path and the second power supply path,
   wherein the enabling unit generates an enabling signal if the power supplier module meets the default condition, and the switch module is switched to a second state in response to the enabling signal,
   wherein the switch module in the second state forms the third power supply path and the fourth power supply path.

4. The power supply system according to claim 3, wherein the switch module comprises a first switch unit, a second switch unit, a third switch unit and a fourth switch unit,
   wherein in the first state, the first switch unit and the third switch unit are in a closed state and the second switch unit and the fourth switch unit are in an opened state so as to form the first power supply path and the second power supply path,
   wherein in the second state, the first switch unit and the third switch unit are in the opened state and the second switch unit and the fourth switch unit are in the closed state so as to form the third power supply path and the fourth power supply path.

5. A power supply method, comprising:
   determining whether a power supplier module meets a default conditions, wherein the power supplier module comprises a first power supplier and a second power supplier;
   transmitting a power provided by the power supplier module to a target device which comprises at least one sub-target device and disabling at least one of the at least one sub-target device to reduce an operating current of the disabled sub-target device and prevent the target device from malfunction due to insufficient power supply if the power supplier module does not meet default condition; and
   transmitting the power provided by the power supplier module to the target device and enabling the at least one sub-target device if the power supplier module meets the default condition,
   wherein the step of transmitting the power provided by the power supplier module to the target device and disabling the sub-target device comprises:
   transmitting a first power provided by the first power supplier to the target device through a first power supply path if the first power supplier is detected and the second power supplier is not detected; and
   transmitting a second power provided by the second power supplier to the target device through a second power supply path if the second power supplier is detected and the first power supplier is not detected, wherein the step of transmitting the power provided by the power supplier module to the target device and enabling the sub-target device comprises:

transmitting the first power to the target device through a third power supply path and transmitting the second power to the target device through a fourth power supply path.

6. The power supply method according to claim 5, wherein the step of determining whether the power supplier module meets the default condition comprises:

determining that the power supplier module does not meet the default condition if the first power supplier and the second power supplier are not detected at the same time; and determining that the power supplier module meets the default condition if the first power supplier and the second power supplier are detected at the same time.

7. The power supply method according to claim 5, further comprising:

controlling a switch module to be in a first state if the power supplier module does not meet the default condition, wherein the switch module in the first state forms the first power supply path and the second power supply path; and generating an enabling signal if the power supplier module meets the default condition, and switching the switch module to a second state in response to the enabling signal, wherein the switch module in the second state forms the third power supply path and the fourth power supply path.

8. The power supply method according to claim 7, wherein the switch module comprises a first switch unit, a second switch unit, a third switch unit and a fourth switch unit, wherein in the first state, the first switch unit and the third switch unit are in a closed state and the second switch unit and the fourth switch unit are in an opened state so as to form the first power supply path and the second power supply path, wherein in the second state, the first switch unit and the third switch unit are in the opened state and the second switch unit and the fourth switch unit are in the closed state so as to form the third power supply path and the fourth power supply path.

* * * * *